United States Patent
Narasimhan et al.

(10) Patent No.: US 8,351,514 B2
(45) Date of Patent: Jan. 8, 2013

(54) METHOD, PROTOCOL, AND APPARATUS FOR TRANSPORTING ADVANCED VIDEO CODING CONTENT

(75) Inventors: Mandayam A. Narasimhan, San Diego, CA (US); Robert O. Eifrig, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1977 days.

(21) Appl. No.: 11/037,439

(22) Filed: Jan. 18, 2005

(65) Prior Publication Data

US 2005/0175098 A1    Aug. 11, 2005

Related U.S. Application Data

(60) Provisional application No. 60/537,075, filed on Jan. 16, 2004.

(51) Int. Cl.
*H04N 7/12*    (2006.01)
(52) U.S. Cl. ............ 375/240.26; 375/240.12; 375/240.2
(58) Field of Classification Search .............. 375/240.12, 375/240.26
See application file for complete search history.

(56) References Cited

U.S. PATENT DOCUMENTS

| | | | |
|---|---|---|---|
| 6,873,740 B1 | 3/2005 | Devillers et al. | |
| 7,170,934 B2 * | 1/2007 | Linzer | 375/240 |
| 7,339,991 B2 | 3/2008 | Haskell et al. | |
| 7,386,049 B2 | 6/2008 | Garrido et al. | |
| 7,831,990 B2 * | 11/2010 | Visharam et al. | 725/95 |
| 2004/0114908 A1 * | 6/2004 | Ito | 386/95 |
| 2004/0179619 A1 | 9/2004 | Tian et al. | |

OTHER PUBLICATIONS

Wiegan T: "Draft ITU-T Recommendation and Final Draft International Standard of Joint Video Specification (ITU-T Rec. H.264/ISO/IEC 14496-10 AVC)" Apr. 2, 2003. ISO/IEC JTC1/SC20/WG11 JVT-G50, Pattaya, XP002328607. p. 203-205 p. 1-7.
PCT International Preliminary Report and Written Opinion. International Bureau of WIPO. Issued Jul. 17, 2006.
Office Action, U.S. Appl. No. 11/037,446, Nov. 28, 2008.
Office Action, U.S. Appl. No. 11/037,446, May 13, 2009.
Office Action, U.S. Appl. No. 11/037,446, Mar. 11, 2011.
Office Action, U.S. Appl. No. 11/037,446, Nov. 23, 2010.
Office Action, U.S. Appl. No. 11/037,446, Mar. 19, 2010.
Office Action, EPC App. No. 05705772.1, Nov. 18, 2010.
ISO/IEC 13818-1:2000 (ITU-T Recommendation H.222.0), "Information technology—Generic coding of moving pictures and associated audio information: Systems", 2nd ed., Dec. 2000.

(Continued)

*Primary Examiner* — Sath V Perungavoor
*Assistant Examiner* — Geepy Pe
(74) *Attorney, Agent, or Firm* — Lori Anne D. Swanson; Stewart M. Wiener (57) ABSTRACT

A method, protocol and apparatus for transporting Advanced Video Coding (AVC) content, e.g., using MPEG-2 systems is disclosed. Specifically, the present method is related to the carriage of various flavors of AVC streams in a uniform fashion over MPEG-2 systems (e.g., both transport and program streams). The method includes generating the AVC content from an input stream, and thereafter transporting the AVC content in a transport stream or a program stream over MPEG-2. The AVC content is generated in accordance with at least one constraint that is associated with the transport stream or the program stream.

6 Claims, 3 Drawing Sheets

OTHER PUBLICATIONS

ISO/IEC 13818-1/2000/Final Proposed Draft Amendment 3 (FPDAM-3), "Amendment 3: Transport of AVC video data over ITU-T Rec H.222.0 |ISO/IEC 13818-1 streams", ISO/IEC JTC1/SC29/WG11 N5467, Feb. 2003.

T. Wiegand, "Study of Final Committee Draft of Joint Video Specification (ITU-T Rec. H.264 |ISO/IEC 14496-10 AVC)", Joint Video Team (JVT) of ISO/IEC MPEG & ITU-T VCEG (ISO/IEC JTC1/SC29NVG11 and ITU-T SG16 Q.6), Document JVT-F100, produced Feb. 16, 2003.

S. Narasimhan, et al., "Comments and clarifications to JVT text JVT-F100", Joint Video Team (JVT) of ISO/IEC MPEG & ITU-T VCEG, Document JVT-G039, Mar. 2003.

J. Van Der Meer, et al., "RTP Payload Format for Transport of MPEG-4 Elementary Streams", IETF RFC 3640, Nov. 2003.

Amendment 3 to ITU-T Recommendation H.222.0 (2000), "Amendment 3: Transport of AVC video data over ITU-T Rec H.222.0 |ISO/IEC 13818-1 streams", ISO/IEC 13818-1:2000/Amd.3, Mar. 2004.

Y. Ogura, "Notice of Publication: ISO/IEC 13818-1:20001Amd. 3:2004", ISO/IEC JTC 1/SC 29 N6390, Nov. 2004.

PCT Search Report, PCT/US2005/001472, Jul. 1, 2005.

PCT International Preliminary Report and Written Opinion, PCT/US2005/001472, Jul. 17, 2006.

PCT Search Report, PCT/US2005/001343, Jul. 5, 2005.

PCT International Preliminary Report and Written Opinion, PCT/US2005/001343, International Bureau of WIPO, Jul. 17, 2006.

A. Basso, et al., "Transmission of MPEG-2 Streams over non-guaranteed quality of service networks", Proc. of Picture Coding Symposium (PCS-97), Berlin, Germany, Sep. 1997.

* cited by examiner

METHOD, PROTOCOL, AND APPARATUS FOR TRANSPORTING ADVANCED VIDEO CODING CONTENT

This application claims the benefit of U.S. Provisional Application No. 60/537,075 filed on Jan. 16, 2004, which is herein incorporated by reference.

BACKGROUND OF THE INVENTION

1. Field of the Invention

Embodiments of the present invention generally relate to an image processing system. More specifically, the present invention relates to a method, protocol and apparatus for transporting Advanced Video Coding (AVC) content.

2. Description of the Related Art

Demands for lower bit-rates and higher video quality requires efficient use of bandwidth. To achieve these goals, the Moving Picture Experts Group (MPEG) created the ISO/IEC international Standards 11172 in 1991 (generally referred to as MPEG-1 format) and 13818 in 1995 (generally referred to as MPEG-2 format), which are incorporated herein in their entirety by reference. One goal of these standards is to establish a standard coding/decoding strategy with sufficient flexibility to accommodate a plurality of different applications and services such as desktop video publishing, video telephone, video conferencing, digital storage media and television broadcast.

The MPEG-1 and MPEG-2 standards have been very effective and have gained wide acceptance in many different implementations. Nevertheless a new coding standard has recently been adopted (2003/2004), i.e., ISO/IEC 14496-10/H.264 known as Advanced Video Coding (AVC). Similar to MPEG, AVC provides tremendous flexibility in various functions that can be implemented in an image processing system. The transport of the AVC content is an area that can be implemented using different schemes. However, the proper transport of the encoded content is an important aspect that affects the efficiency and performance of an encoding/decoding system.

Thus, there is a need in the art for a method, protocol and apparatus for transporting Advanced Video Coding (AVC) content.

SUMMARY OF THE INVENTION

In one embodiment, the present invention discloses a novel method, protocol and apparatus for transporting Advanced Video Coding (AVC) content. For example, a novel method, protocol and apparatus for transporting Advanced Video Coding (AVC) content using MPEG-2 systems is disclosed.

Specifically, the present invention is related to the carriage of various flavors of AVC streams in a uniform fashion over MPEG-2 systems (e.g., both transport and program streams). AVC coding mandates only the VCL (video coding layer) elements and all other elements such as parameter sets, timing data and display parameters are optional in the in-band AVC stream. As all of these elements are required by different applications that use MPEG-2 systems and for conformance verification of AVC streams, the present invention discloses MPEG-2 system specific tools and/or constraints to generate the optional elements that are not present in the in-band AVC stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

In one embodiment, the present invention discloses a novel method, protocol and apparatus for transporting Advanced Video Coding (AVC) content. For example, a novel method, protocol and apparatus for transporting Advanced Video Coding (AVC) content using MPEG-2 systems is disclosed.

In one embodiment, the present invention discloses the elements required to create an MPEG-2 transport stream with AVC content. Carriage of AVC content in MPEG-2 systems allows the majority of the tools used for demultiplexing, synchronization and buffer management to be re-used by currently deployed decoders.

It should be noted that although the present invention is described within the context of MPEG-2 systems, the present invention is not so limited. Namely, the present approach can be adapted to other similar transport systems compliant to any other compression standards, e.g., MPEG-4 part 2 (14496-2), H.261, H.262, H.263, Amendment-1 to AVC and so on. In other words, the present invention can be applied to any other compression standards that allow a flexible transport implementation.

Figure 1:
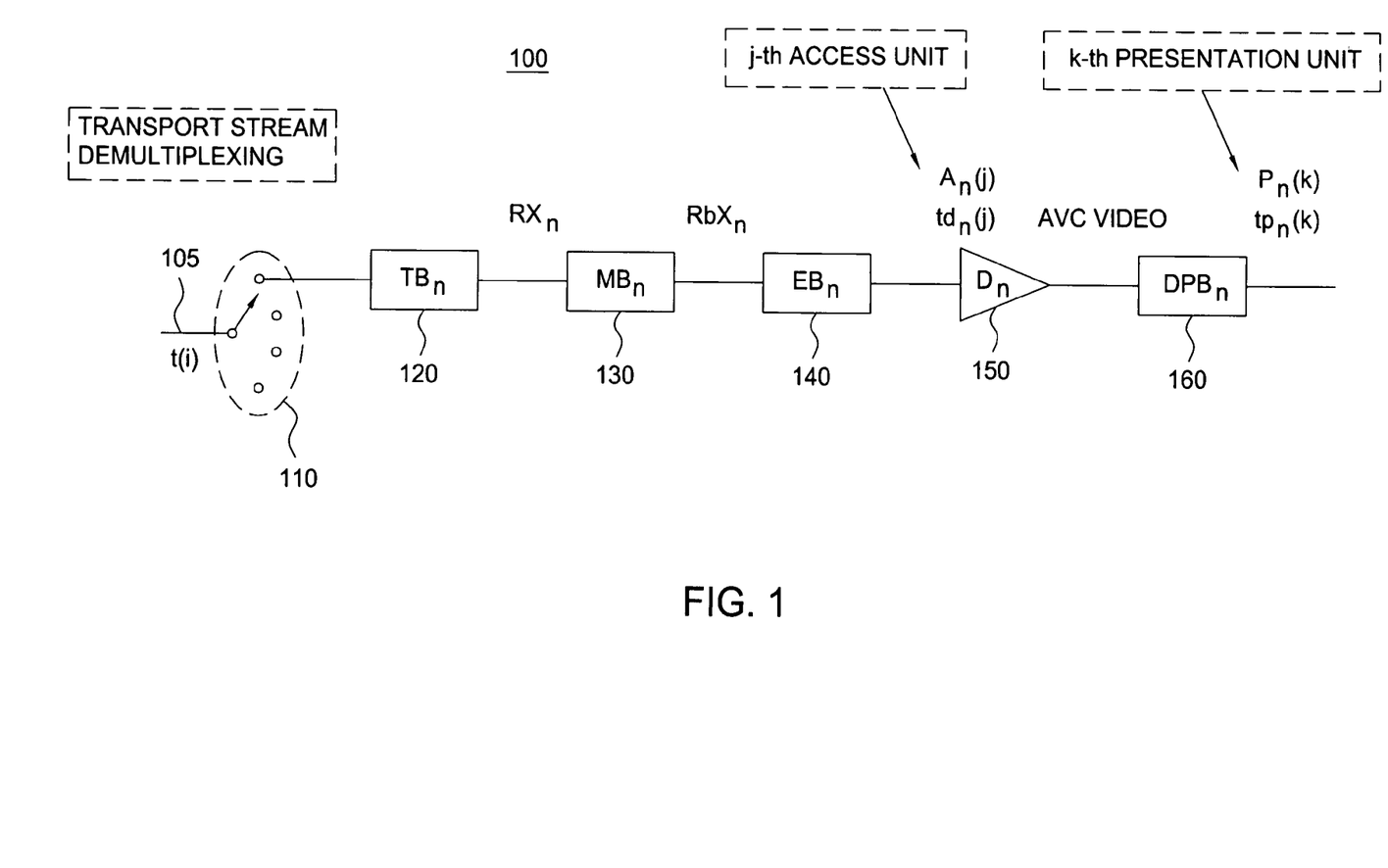
FIG. 1 illustrates a Transport-System Target Decoder (T-STD) model of the present invention.

FIG. 1 illustrates a Transport-System Target Decoder (T-STD) 100 model of the present invention. The T-STD model comprises a demultiplexer 110, a transport buffer $TB_n$ 120, a multiplex buffer $MB_n$ 130, an elementary stream decoder buffer $EB_n$ 140, a delay $D_n$ 150, and a decoded picture buffer $DPB_n$ 160. The three buffers $TB_n$ 120, $MB_n$ 130, and $EB_n$ 140 are used to decode each AVC video elementary stream n.

To illustrate, the Transport-System Target Decoder 100 is defined to enable multiplexers to create data streams that are decodable by all receivers. In one embodiment, the transport buffer $TB_n$ 120 inputs data at the full rate of the transport stream 105, but outputs data (if present) at a rate $Rx_n$ that may depend on the data type and specification. The multiplex buffer $MB_n$ 130 is used for video and is intended to alleviate the effect of transport stream packet multiplexing. In one embodiment, the output rate of the multiplex buffer $MB_n$ 130 can be specified in one of two ways. First, with the "Leak Method", the $MB_n$ outputs data (if present and if $EB_n$ is not full) at a rate $Rbx_n$ that depends on the data type and specification. With the "VBV_delay Method", the output rate is piecewise constant for each picture and is specified by the encoder using parameters in the video stream. Finally, the elementary stream decoder buffer $EB_n$ 140 whose size is generally fixed for audio and systems and is specified in the video stream for video.

In one embodiment, use of the STD defined Leak Method for management of data between $MB_n$ and $EB_n$ as a default can be implemented. This approach is exactly the same as defined for MPEG-2 video management. In addition, the present invention will specify the Hypothetical Reference Decoder (HRD) based Leak Method and this will be signaled using a new descriptor (HRD-STD descriptor) as disclosed below. To illustrate, this descriptor will be very similar to the STD descriptor and will use an hrd_leak_valid flag within the descriptor. If the HRD-STD descriptor is present in the Program Map Table (PMT) or Program Stream Map (PSM) and the hrd_leak_valid flag is set to "1", then the STD management will use the HRD defined Leak Method. This method is slightly different from the standard Leak Method and may require extensions.

Since the present invention describes the carriage of AVC content in MPEG-2 systems, the definition of AVC elementary stream is now briefly described. More specifically, various aspects of the AVC elementary stream are being defined and/or modified so that it can be transported by MPEG-2 systems.

In one embodiment, even though the AVC standard specifies Network Abstraction Layer (NAL)-Units and byte-stream format, carriage over MPEG-2 systems will be constrained to byte-stream format only. As a result, this provides the 4-byte start codes for all the higher level syntactic elements in the AVC video stream that is similar to MPEG-2 video. The start codes will be of the form 0x000001NN where NN is the 8-bit NAL header. The NAL header starts with a 1-bit element (forbidden bit) which is mandated to be set to "0" in the AVC standard, followed by a 2-bit element (nal_ref_idc) and a 5-bit element (nal_unit_type). Note that the mandated use of "0", for forbidden_bit avoids any MPEG-2 system start code conflict (as the PES start codes always start with a "1", in this bit-field (0x0000 0000 0000 0000 0001 1xxx yyyy). The semantics of these fields as defined in the AVC standard is discussed below.

In one embodiment, nal_ref_idc is set to "00" for pictures that are not used as reference. These are presented at the Presentation Time Stamp (PTS) time defined in the Packetized Elementary Streams (PES) header and the PTS value of these pictures could be equal to or greater than the Decoder Time Stamp (DTS). When PTS=DTS and nal_ref_idc is zero, the decoded picture is presented immediately and is not stored in the DPB. When PTS>DTS and nal_ref_idc is zero, the picture is stored in the DPB till the system clock reaches PTS time. Nal_ref_idc is mandated to be set to "00" for Supplemental Enhancement Information (SEI) and filler data as these apply to the current picture only. In addition, nal_ref_idc is mandated to be set to a non-zero value for sequence-parameter set, picture-parameter-set and Instantaneous Decoding Refresh (IDR) pictures. Both the sequence and picture parameter sets are expected to be cached in the video decoder and not stored in the DPB. In one embodiment, nal_ref_idc can also be set to "00" for access unit delimiter.

In one embodiment, the remaining 3 values of nal_ref_idc (1, 2 and 3) can be used for signaling transport priority even though this may be redundant for many of the transport systems (such as MPEG-2 transport and RTP). As many of the transport systems provide priority in the transport layer and can do this based on the NAL type, the present invention may allocate only one value of nal_ref_idc (e.g., "01") and reserve the other 2 values "10" and "11" for future extensions. This will simplify the parsing of 4-byte start codes for picture headers and parameter sets. Currently 2 byte-streams that carry identical data can use 2 different values for this field making the streams different.

In one embodiment, the nal_unit_type currently specifies 13 values with 19 values reserved for future extensions. The unit type specifies slice header, IDR picture, seq-parameter set, picture-parameter set, access-unit-delimiter, end-of-sequence, end-of-stream, SEI and filler-data. The MPEG-2 video constructs of seq-display-extension, pic-display extension, Group of Pictures (GOP) header and user_data are specified via Video Usability Information (VUI) and SEI in AVC. Unlike MPEG-2 where "stuffing" was usually used at the end of the picture, stuffing did not have any start codes and all the stuffing bytes were part of the picture that preceded them, the filler-data mechanism specifies a start-code 0x0000010C for filler data and payload value is mandated to be 0xFF (in MPEG-2 0x00 was used). This can also be inserted at any level (slice, before picture, after picture) in the byte-stream.

The AVC standard also defines an AVC Access Unit. Even though the definition of an access unit is very broad (all the bits associated with a picture and not transmitted in a specific sequence), carriage over MPEG-2 will require constraints in the ordering so that the PES parsing and buffer management can be simplified. AVC specifies the following constraints in the standard.

First, sequence-parameter set should be sent before any picture-parameter set and picture data that refers to the seq-parameter-set. Unlike MPEG-2, AVC defines 32 id values for sequence-parameter set and all of these 32 sets can be sent early in the bit stream. Sequence and picture-parameter sets can be repeated before any picture. Active seq-parameter-set (parameter-set referenced by the current IDR picture) cannot be changed unless a new IDR picture follows it, i.e., AVC mandates the use of same seq-parameter-set between two IDR pictures. However, if the seq-parameter-set does not change, AVC does not require a seq-parameter-set before every IDR picture. If signaled, this also includes the VUI data, which provides the information such as aspect-ratio, color-primaries, frame timing, frame rate (implied by the use of fixed_frame_rate_flag in VUI) and HRD buffer definition data. VUI is similar to the seq-display-extension and seq-extension data in MPEG-2. AVC does not mandate that VUI be included in the stream for compliance and this can be specified by application-based standards.

Second, picture-parameter set should be sent before any picture data that refers to the picture parameter set. Usually picture-parameter-set follows seq-parameter-set in decoding order. However, when the seq-parameter-set and picture-parameter-set are repeated for broadcast applications, they could be sent out of order (i.e., picture-parameter-set before seq-parameter-set) and still comply with the AVC standard.

In one embodiment, in order to avoid confusion in compliance for applications that require random access at any point in the stream, one can mandate that picture-parameter-set always follow the seq-parameter-set when both are repeated.

Third, SEI should be sent before the picture data that it refers to. In the AVC standard, two SEI messages can be sent with one immediately following the other and then 2 pictures and it does not specify how to associate the SEI messages with the pictures.

In one embodiment, it is noted that the AVC standard does not specify a mechanism to attach the right SEI with the picture. The only mechanism that makes the attachment possible is the use of access-unit-delimiter. If the access-unit-delimiter is used, then the two SEI messages cannot be sent together. However, access-unit-delimiter is not mandated for compliance in AVC. As such, the AVC standard is broken for streams that include the SEI messages and do not include the access-unit-delimiter. As such, in one embodiment, SEI messages should only be sent immediately before the picture data and not ahead of time.

Fourth, if a access-unit-delimiter is sent with each picture, then the following sequencing is mandated—access-unit-delimiter→SPS→PPS→SEI→slice-data. Filler data can be sent anywhere between the access-unit-delimiter and the next access-unit-delimiter and all the filler data between 2 access-unit-delimiters will be part of the picture in-between. Once again, this is optional in AVC. Access-unit-delimiter is also a 4-byte code with the last byte defining the picture-type. In addition to MPEG-2 picture types of I, P and B AVC picture types include IDR, SI and SP. The access-unit-delimiter can be used in the definition of access-unit, data-alignment and random-access-points for carriage of AVC over MPEG-2.

Fifth, end-of-sequence and end-of-stream are 4-byte codes (0x0000010A and 0x000010B) and they are defined very similar to MPEG-2. The picture after an end-of-sequence is mandated to be an IDR picture and the use of end-of-stream in broadcast is uncertain. In MPEG-2, an end of sequence required a seq-start-code to begin the next sequence while AVC does not mandate this unless the subsequent IDR picture refers to a new seq-parameter-set. As AVC does not explicitly define "still pictures" (same as MPEG-2 video), the carriage over MPEG-2 can define "AVC still" as a single sequence with an IDR picture-"access-unit-delimiter→seq-parameter-set→picture-parameter-set→SEI→IDR picture→end-of-sequence". Note that an end-of-sequence is required to signal still pictures and the AVC standard requires an IDR picture after an end-of-sequence instead of an I picture.

For carriage of AVC content within MPEG-2, the present invention specifies various additional constraints in addition to the five constraints defined in AVC as an "access unit" should have a consistent definition for carriage using PES. Access unit is also important for removal of bytes from the CPB. As such, the AVC access unit should be defined with the following constraints.

First, an "access unit" should always start with a access-unit-delimiter, that indicates the type of slices present in the primary coded picture. This makes the access unit delimiter mandatory for carriage over MPEG-2. In addition, the access-unit-delimiter should be included before any seq-parameter-set/sets or picture-parameter-set/sets.

Second, all the bytes starting with the access-unit-delimiter and ending before the first byte of the next access-unit-delimiter represent the coded bytes of the picture and are part of the same "access unit".

Third, the sequence of bytes that form an "access unit" should always be as follows:
Access-unit-delimiter→seq-parameter-set or sets (if present or repeated for the following picture)→picture-parameter-set or sets (if present or repeated for the following picture)→SEI 1→SEI 2→slice-data→end-of-sequence (if present)→end-of-stream (if present).
This constraint is close to that defined in the AVC standard except for the normative requirement for access-unit-delimiter to be sent before the seq-parameter-set and picture-parameter-set as well as sending all the SEI messages before the start of first slice.

Fourth, "AVC still pictures" should be defined as a video sequence containing exactly one coded IDR picture. The picture has an associated PTS value and the presentation time of any subsequent picture shall be later than that of the "AVC still picture" by at least 2 picture periods. This is exactly the same definition for MPEG-2 video except for the use of IDR picture instead of I-picture. In addition, the "AVC still picture" bytes should be defined as: "access-unit-delimiter value of 0x00000125→seq-parameter-set→picture-parameter-set→SEI 1→SEI 2→IDR picture slices→filler-data (if any)→end-of-sequence". The NAL header in the access-unit-delimiter will set the forbidden_bit and nal_ref_idc to "001" and use the nal_unit type value of "00101". Note that even though the nal_ref_idc uses "01" to signal that the DPB will keep this picture for future reference, the next IDR picture in the "AVC still" will flush the last IDR picture from the DPB. Note that information related to "picture-period" will be required in the parameter sets to distinguish an AVC "still" from non-still sequences. Hence the present invention will mandate the use of seq-parameter-set with VUI and timing information for each "still" in the AVC byte-stream or have a means to convey this information through a descriptor that can be used by MPEG-2 systems. The present invention discloses the use of the HRD-STD descriptor structures to include information about picture-period in 90 kHz clock, frame-rate (using a 2 bit code) and presence of film-mode.

In one embodiment, the present invention defines AVC specific extensions to the MPEG-2 systems, e.g., coding of time stamps. Specifically, the present invention discloses various constraints on the coding of time stamps for MPEG-2 video that do not apply for AVC and need to be extended:

First, in non-low_delay mode, current standard mandates that the PTS time of an I or P picture (reference picture) be the same as the DTS time of next transmitted I or P picture within the same sequence. In the case of AVC, this rule does not apply because there is no need for any constraints on the coding of PTS versus DTS values.

Second, in the current MPEG-2 standard, the frequency of coding PTS values in the PES header is limited to less than or equal to 0.7 seconds except for "still video". This rule assumed that the frame_rate was known and was held constant within the sequence. In addition, the rule assumed that the film-mode signaling in video was always present.

In one embodiment, in the case of AVC, the same rule can apply only if the VUI_parameters present flag is set to "1" (in the seq-parameter-set) and the fixed_frame_rate_flag is set to "1" in the VUI with appropriate values for time_scale and num_units_in_tick are present in the AVC byte-stream or this is signaled using the AVC descriptor. Otherwise, each "access unit" of AVC should be required to include a PES header with coded values of PTS and DTS in the header. The association of DTS/PTS with the access unit within the PES packet should also be changed from "picture-start-code" for MPEG-2 to access-unit-delimiter for AVC.

Third, the DTS is only required if PTS and DTS were different. In MPEG-2, all B frames did not require a DTS in the PES header. This rule still applies for AVC as B frames that are stored as reference in DPB may have a different PTS. No change to this rule is required for AVC.

Fourth, the value of pts_dts_flags="01" is forbidden in 13818-1:2000. In AVC, there may be long-term reference frames in the DPB that have a presentation time that differs from decoding time by an amount that is larger than the 33-bit field for PTS and DTS. These frames may have to be signaled using a zero value for PTS field and the actual output time from the DPB can be computed using the video stream parameters. This will require an extension to the 13818-1:2000 standard and allocate the flag value of "01" to AVC streams only for such long-term reference frames.

In one embodiment, in order to avoid compatibility issues with existing MPEG-2 decoders, the present invention precludes long-term reference pictures whose output or PTS time (computed using the Picture Order Count (POC) number) exceeds the current clock value by 33 bits.

Fifth, the semantics of random_access_indicator in the adaptation header needs to be modified as it is very specific to MPEG-2 video (use of seq-header) and audio.

In one embodiment, for AVC, the rule should be changed to the use of access-unit-delimiter with pic_type values of 0 or 1 (I or P pictures) or IDR picture or pictures that are preceded by a recovery-point-SEI. The other rule of including a PTS and Program Clock Reference (PCR) in the transport still applies to AVC.

Sixth, the semantics of splice countdown in the adaptation header needs to be revised for AVC. For MPEG-2 video the packet after splicing is expected to start with an "access point" or "seq-end-code followed by access-point".

In one embodiment, this should be revised to indicate AVC access unit or end-of-sequence code followed by the AVC-access-unit.

Seventh, seamless splicing as defined using the adaptation header requires that the parameters specified in the different tables for splice_delay be extended for AVC.

Eighth, the semantics of data_alignment_indicator in the PES header needs to be revised for AVC as the current semantics are tied to seq-header and GOP header of MPEG-2 video.

In one embodiment, for AVC the alignment should be specified as access-unit-delimiter or slices-start-code using a descriptor and in the absence of the descriptor, the alignment should be access-unit-delimiter only.

Ninth, when PTS and DTS values are mapped using the HRD parameters, accurate translation of non 90-kHz based clocks used by AVC to 90-kHz clock in MPEG-2 should be defined.

In the AVC standard, the HRD parameters are normative for the bitstream only if VUI_parameters_present_flag is set to "1" (in the seq-parameter-set), hrd_parameters_present flag and timing_info_present_flags are both set to "1" (in the VUI). These flags then mandate that all the parameters for HRD buffer management (time_scale, num_units_in_tick, cpb_size, bit_rate, initial_cpb_removal_delay_offset, initial_cpb_removal_delay, cpb_removal_delay and dpb_output_delay) are sent in the VUI and SEI messages. The carriage should accurately map all these HRD parameters, if they are present in a coded video stream as this is expected to be used in applications where the video coding is done separately from the transport multiplexing or for interchange of AVC content carried over IP and that carried over MPEG-2. The buffer sizes Mb and Bb in the STD are set using the cpb_size and bit_rate from VUI. The following rules apply to the coding of time stamps when the HRD parameters are present.

First, random-access to an AVC stream with accurate HRD management is only possible if the seq-parameter-set, VUI, picture-parameter-set, buffering-period-SEI and/or picture-timing-SEI are acquired in this sequence. Parsing of SEI messages is not possible without the seq-parameter-set and VUI. In addition, these need to be repeated at regular intervals for broadcast applications.

Second, note that all the delay values from the SEI messages need to be converted from their time base defined in AVC to 90-kHz time base of MPEG-2. DTS for the picture after random-access can be obtained by adding the initial_cpb_removal_delay value (from buffering period SEI) to the PCR value of the packet where DTS is sent. After random-access the DTS value for subsequent pictures that carry the cpb_removal_delay (in picture timing SEI) is obtained by (previous initial_cpb_removal_delay+cpb_removal_delay+PCR).

Third, PTS value for each picture can be obtained by adding the dpb_output_delay (from picture timing SEI) to the DTS value obtained from above.

In one embodiment, it should be noted that as the dpb_output_delay and picture-structure data is contained in the picture timing SEI that is not sent for pictures that are preceded by a buffering period SEI, there is currently no way of computing the DPB output time or PTS for pictures that are preceded by the buffering period SEI. As such, in one embodiment, the present invention includes the dpb_output_delay and picture-structure in the buffering period SEI syntax. In addition, for streams that want to signal picture-structure and picture-timing only, AVC mandates the sending of HRD buffer management parameters and this should be detached. This can be done by changing the normative statement that precludes sending the picture-timing SEI if nal_hrd_parameters_present_flag is set to "0" as one can still send picture-timing SEI with the picture-structure.

On the other hand, AVC streams can be generated without the HRD parameters and this requires that the buffer sizes Mb and Eb comply with the default sizes and rates from Annex A of the AVC standard. In addition, implementations that combine video encoding and transport packetization (such as broadcast systems), the AVC video stream within the Transport stream (TS) or Program stream (PS) may not include the HRD parameters and the buffer management can be performed using the MPEG-2 elements (such as PTS, DTS and PCR), AVC video stream as well as the HRD-STD descriptor as described below.

A descriptor is a data structure that carries descriptive and relational information about the program and the PESs therein. In one embodiment, the HRD-STD descriptor provides basic information for identifying coding parameters of such video elementary streams that is not present in an explicit form in the AVC byte-stream as well as buffer management using the HRD leak method. Table 1 illustrates the syntax and semantics for an exemplary HRD-STD descriptor.

TABLE 1

| Syntax | No. of bits | Mnemonic |
|---|---|---|
| HRD-STD descriptor ( ) { | | |
|   descriptor_tag | 8 | uimsbf |
|   descriptor_length | 8 | uimsbf |
|   hrd_leak_valid | 1 | uimsbf |
|   reserved | 6 | uimsbf |
|   picture_info_present | 1 | uimsbf |
|   if (picture_info_present) { | | |
|     num_units_in_tick | 32 | uimsbf |
|     time_scale | 32 | uimsbf |
|     fixed_frame_rate_flag | 1 | uimsbf |
|     film_mode_present | 1 | uimsbf |
|     reserved | 6 | uimsbf |
|   } | | |
| } | | |

The semantic definition of pertinent fields in HRD-STD descriptor is provided below (other definitions can be found in the AVC standard):

hrd_leak_valid—This 1-bit field when set to "1" indicates that the transfer of bytes from $MB_n$ to $EB_n$ shall follow the HRD leak method as defined in Annex C of ISO/IEC 14496-10. Otherwise, the MPEG-2 leak method as defined in section 2.4.2.3 of ISO/IEC 13818-1: 2000 shall be used picture_info_present—This 1-bit field when set to "1" indicates that the picture timing information required to process the MPEG-2 system stream containing ISO/IEC 14496-10 data is included in this descriptor film_mode_present—This 1-bit field when set to "1" indicates that the underlying ISO/IEC 14496-10 stream contains film mode coding information such as "repeat first field". If such information is carried within the video elementary stream using the picture_timing SEI, then the timing information for video access units can be derived from the previously decoded picture. If this information is not present in the video ES, then a PES header shall be present for each access unit with the PTS/DTS information.

The constraints discussed above can be implemented in another descriptor. In one embodiment, the AVC video descriptor as shown in Table 2 provides basic information for identifying coding parameters of the associated AVC video stream. This descriptor can be used to signal the highest level and a compatible profile for the entire video stream. This descriptor also signals the presence of AVC stills as well as the 24-hour pictures in the coded video sequence. If this descriptor is not included in the PMT for the AVC video stream, then the coded video sequence shall not contain AVC stills or 24-hour pictures.

TABLE 2

| Syntax | No. of bits | Mnemonic |
| --- | --- | --- |
| AVC_video_descriptor ( ) { | | |
|   descriptor_tag | 8 | uimsbf |
|   descriptor_length | 8 | uimsbf |
|   profile_idc | 8 | uimsbf |
|   constraint_set0_flag | 1 | bslbf |
|   constraint_set1_flag | 1 | bslbf |
|   constraint_set2_flag | 1 | bslbf |
|   reserved_zero_5bits (equal to 0) | 5 | bslbf |
|   level_idc | 8 | uimsbf |
|   AVC_still_present | 1 | bslbf |
|   24_hour_picture_flag | 1 | bslbf |
|   reserved | 6 | uimsbf |
| } | | |

Pertinent semantic definition of fields in AVC video descriptor is as follows (other definitions can be found in the AVC standard):

AVC_still_present—This 1-bit field when set to "1" indicates that the AVC video stream may include AVC still pictures. When set to "0", then the associated AVC stream shall not contain AVC still pictures.

24 hour_picture_flag—This 1-bit flag when set to "1" indicates that the associated AVC video stream may contain AVC access units with a presentation time that is more than 24 hours (24×3600×(system clock frequency % 300)) in the future. If this flag is set to "0", the associated AVC video stream shall not contain such AVC access units.

The constraints discussed above can be implemented in yet another descriptor. The AVC-timing and HRD descriptor as shown in Table 3 provides information on the timing and HRD parameters of the associated AVC video stream. If these parameters are not present in the VUI of associated AVC stream, the descriptor shall be included in the PMT or PSM for STD and HRD conformance.

TABLE 3

| Syntax | No. of bits | Mnemonic |
| --- | --- | --- |
| Timing and HRD descriptor ( ) { | | |
|   descriptor_tag | 8 | uimsbf |
|   descriptor_length | 8 | uimsbf |
|   hrd_mamagement_valid | 1 | bslbf |
|   reserved | 6 | bslbf |

TABLE 3-continued

| Syntax | No. of bits | Mnemonic |
| --- | --- | --- |
|   picture_and_timing_info_present | 1 | bslbf |
|   if (picture_and_timing_info_present) { | | bslbf |
|     90kHz_flag | 1 | bslbf |
|     reserved | 7 | bslbf |
|     if (90kHz_flag=='0') { | | |
|       N | 32 | uimsbf |
|       K | 32 | uimsbf |
|     } | | |
|     num_units_in_tick | 1 | uimsbf |
|   } | | |
|   fixed_frame_rate_flag | 1 | bslbf |
|   temporal_poc_flag | 1 | bslbf |
|   picture_to_display_conversion_flag | 1 | bslbf |
|   film_mode_present | 1 | bslbf |
|   reserved | 5 | bslbf |
| } | | |

Pertinent semantic definition of fields in AVC timing and HRD descriptor is as follows (other definitions can be found in the AVC standard):

hrd_management_valid—This 1-bit field when set to "1" indicates that the Buffering Period SEI and Picture Timing SEI messages shall be present in the associated AVC video stream and that the transfer of bytes from $MB_n$ to $EB_n$ shall follow the HRD defined method using the delay values from Buffering Period SEI and Picture Timing SEI messages. When this bit is set to "0", the leak method shall be used for the transfer from $MB_n$ to $EB_n$. picture_and_timing_info_present—This 1-bit field when set to "1" indicates that the 90 kHz_flag and parameters for accurate mapping to 90 kHz system clock are included in this descriptor.

90 kHz_flag, N, K—The 90 kHz_flag, when set to "1" indicates that the frequency of the AVC time base, as defined by the AVC parameter time_scale is 90 kHz, that is equal to (system_clock_frequency % 300). If this flag is set to "0", then the relationship between the AVC time base and the STC shall be defined by the parameters N and K in this descriptor as follows.

$$F_{AVC}=(N\times27\,000\,000)/K,$$

where $f_{AVC}$ denotes the exact frequency of the AVC time base, with K larger than or equal to N.

This allows mapping of time expressed in units of $f_{AVC}$ to 90 kHz units, as needed for the calculation in decoders of time stamps for AVC access units for which no PTS or DTS is encoded in the PES header. fixed_frame_rate_flag—When this flag is set to "1", it indicates that the coded frame rate is constant within the AVC video stream. When this flag is set to "0" no information about the frame rate of the associated AVC video stream is provided in this descriptor.

temporal_poc_flag—When the temporal_poc_flag is set to "1" and the fixed_frame_rate_flag is set to "1", then the associated AVC video stream shall contain POC coded in such a way that each POC unit represents a unit of presentation time (DPB removal time) equal to $\Delta t_{fi,\,dpb}$. Note that this reduces the overhead necessary to signal timing for each access unit. An effective PTS and DTS can be calculated for access units that do not contain an explicit PTS/DTS. Repetition of most recently presented field of the appropriate parity (or frame) is implied when $\Delta PTS$ is greater than $2\Delta t_{fi,\,dpb}$ (or greater than $\Delta t_{fi,\,dpb}$ when frame_mbs_only is equal to 1).

Film_mode_present—. This 1-bit field when set to "1" indicates that the associated AVC stream may include film mode coding information in the picture_timing SEI. In that case, the timing information for successive AVC access units can be derived from the previously decoded picture. If film_mode_present is set to "1", temporal_poc_flag is set to "0" and picture_timing SEI is not present, in the AVC video stream, then a PES header with coded values of PTS/DTS shall be present for each access unit in the coded video sequence. When the film_mode_present flag is set to "0", then the AVC video sequence shall not contain the picture structure in the SEI.

The DPB buffer size is specified in the AVC standard and this includes both the stored reference pictures as well as pictures waiting for their output time. With the instantaneous decoding model of MPEG-2 systems, decoded picture data from the CPB is instantaneously put into the DPB buffer and hence there is no need to specify the input rate into the DPB buffer. DPB has 2 functional outputs: one is an output of picture to a display device and the second is the removal of bytes from DPB once the picture is no longer needed for reference. The present invention lists the following DPB management functions.

First, decoded pictures are stored in the DPB only if the nal_ref_idc value for that picture is non-zero or if the PTS value is greater than DTS. Note that PTS and DTS may be the same for pictures where nal_ref_idc is non-zero. Coding of the picture (frame or field) defines the number of bytes used in the DPB. A frame picture uses full memory while a field picture with another field picture with opposite parity uses half the memory. Each picture stored in the DPB is associated with its nal_ref_idc value, PTS time, short-term frame index, long-term frame index and POC number for DPB management. Following rules apply for reference pictures where nal_ref_idc is nonzero:

a. If nal_ref_idc is non-zero for the current decoded picture and the slice header does not include any MMCO, the picture is stored in the DPB with the next value of short-term index. If the total number of reference frames in the DPB (short term long term) exceeds the profile limit, then the nal_ref_idc of oldest short-term reference picture is set to zero.
 b. if nal_ref_idc is non-zero for the current decoded picture and the slice header includes an MMCO command, then the picture storage follows the rules from the AVC standard.

Second, output time of the picture in DPB is determined from its POC number (smallest in the DPB) and PTS value and the rules for mapping HRD parameters in the AVC video stream to PTS is defined earlier.

Third, pictures that use the 3:2 pulldown signaling (either using the picture-structure in picture-timing SEI or PTS based management using the signaling from the HRD-STD descriptor) require the output of repeated field from the DPB buffer. The DPB buffer needs to be partitioned correctly for this capability.

Fourth, removal of bytes from the DPB is slightly more complex. The syntax elements that manage this removal are contained in either the slice header or in the optional element dec_ref pic_marking( ), which can either be included in the slice header or in the decoded-reference-picture-marking-repetition SEI message. The following specifies the management of data within DPB buffer:

a. If there is a stored picture whose nal_ref_idc was zero then this is removed when the PCR clock equals PTS.
 b. An IDR picture will signal the DPB to clear the nal_ref_idc value of all reference pictures. IDR picture is detected by nal_unit_type value of "5" or start code value of 0x00000125. In addition, if no_output_of_prior_pics_flag in dec_ref_pic_marking( ) is set to "1" then any other picture waiting for its PTS time is also removed from DPB. Note that pictures that have nal_ref_idc equal to zero with the PTS time less than PCR are not removed if n_output_of_prior_pics_flag is set to "0".
 c. If the mmco value in dec_ref_pic_marking( ) is set to "1" or "2", then the nal_ref_idc value of this picture is set to zero and this picture is removed from the DPB if its PTS time is lower than the system time.

Fifth, if the dec_ref_pic_marking( ) is only located in the slice header, this makes it difficult to parse from an STD model. Carriage of decoded-reference-picture-marking-repetition-SEI message makes the DPB management somewhat simpler even though this still requires video layer parsing. As a first step, use of this SEI message for any AVC stream that uses MMCO should be made mandatory for carriage of AVC in MPEG-2 systems.

Sixth, for encoding systems that create an MPEG-2 transport stream by integrating the AVC video coding with packetization, DPB management can be performed without the use of picture timing SEI and decoded-reference-picture-marking-repetition-SEI messages as one can use the sliding window based POC and reference picture marking.

Figure 2:
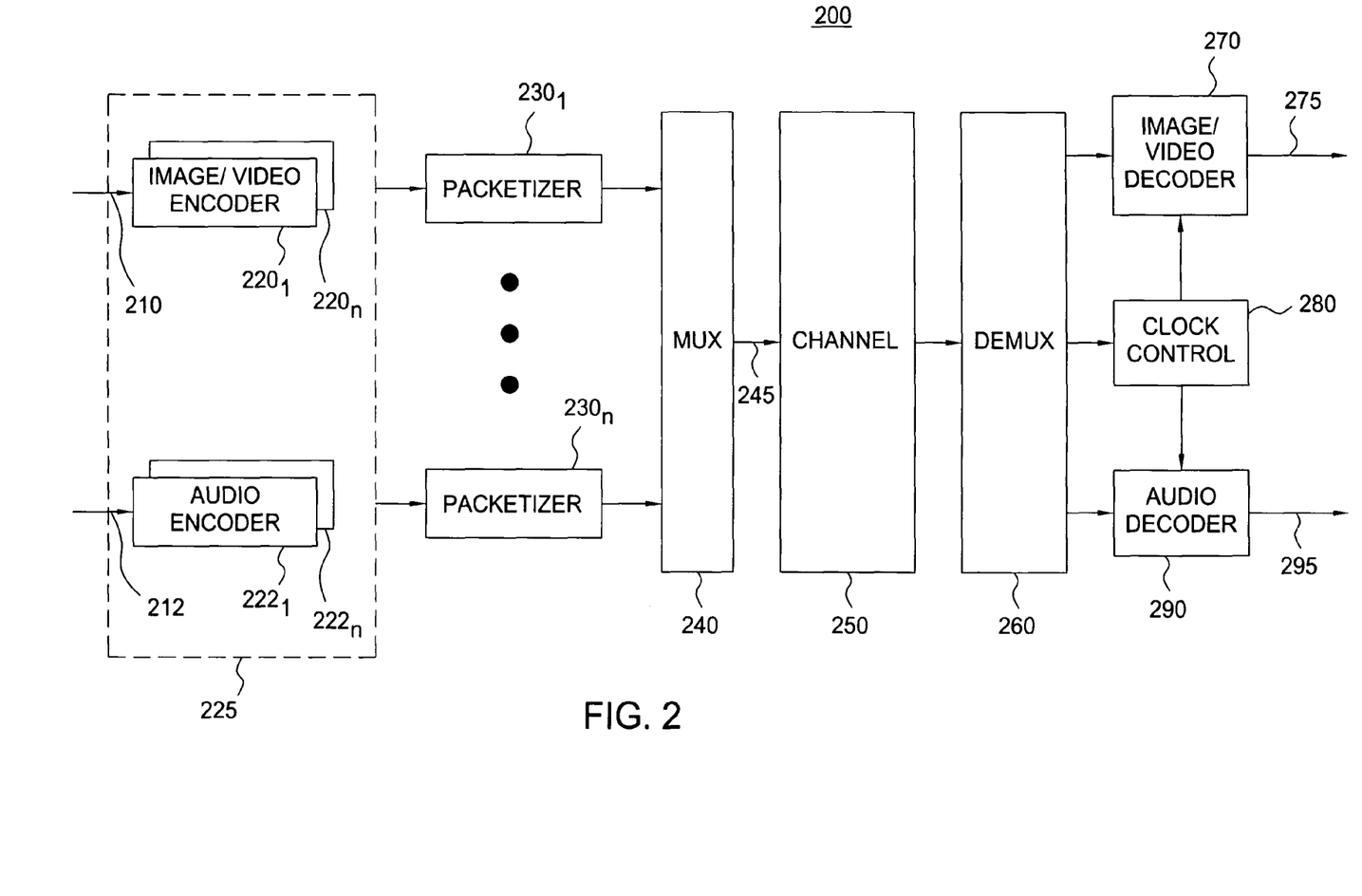
FIG. 2 illustrates a block diagram of a simplified packet stream system of the present invention.

FIG. 2 illustrates a block diagram of a simplified structure of a packet stream system 200 of the present invention. Specifically, the above disclosure pertaining to the carriage of AVC content using an MPEG-2 system can be illustrated in FIG. 2 For illustration, a data stream such as a "transport stream" as defined in accordance with the MPEG standards is used in the packet stream system illustrated in FIG. 2. Although the present invention is described below using the transport stream as an example, those skilled in the art will realize that the present invention can be applied to any packet streams, e.g., an MPEG "program stream" or any other packet streams in accordance with other formats. Furthermore, although the present invention is described below using the term "stream", it should be understood that the various operations described below may be performed on the entire stream or portion thereof.

System 200 includes an image/video encoder 220 for receiving and encoding video data 210 into an elementary video bitstream. In one embodiment, the video encoder 220 is an AVC compliant encoder. Throughout this disclosure the terms image sequence, images, and video are used interchangeably.

Similarly, the system may include an audio encoder 222 for receiving and encoding audio data 212 into an elementary audio bitstream. However, those skilled in the art will realize that a plurality of image/video encoders $220_n$ and audio encoders $222_n$ can be employed to produce a plurality of elementary bitstreams. In fact, the plurality of video and audio encoders can be collectively represented by a server 225, which may employ various encoders and/or may simply contain a plurality (or a library) of stored elementary streams in various storage media. Generally, the output of such server contains interleaved program streams.

In turn, these bitstreams are sent to packetizers 230 of the present invention, where the elementary bitstreams are converted into packets. Information for using the packets independently of the transport stream may be added when the packets are formed. Thus, non-audio/video data are allowed, but they are not shown in FIG. 2. It should be noted that although in a preferred embodiment, the present encoder and the packetizer are implemented in a single module, those skilled in the art will realize that the functions performed by the encoder and the packetizer can be jointly or separately implemented as required by a particular application.

The packets are received and multiplexed by the transport stream multiplexer 240 to produce a transport stream 245. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 245 is transmitted over a transmission channel 250, which may further incorporate separate channel specific encoder and decoder (not shown). Next, the transport stream 245 is demultiplexed and decoded by a transport stream demultiplexor 260, where the elementary streams serve as inputs to video decoder 270 and audio decoder 290, whose outputs are decoded video signals 275 and audio signals 295, respectively.

Furthermore, timing information is also extracted by the transport stream demultiplexor 260 and delivered to clock control 280 for synchronizing the video and audio decoders with each other and with the channel. Synchronization of the decoders with the channel is accomplished through the use of the timing information in the transport stream. Since the present invention discloses the carriage of AVC content using the MPEG-2 systems, a novel output timing conformance method is disclosed in the US patent application bearing U.S. patent application Ser. No. 11/037,446, which is simultaneously filed with the present application on Jan. 18, 2005 and is herein incorporated in its entirety by reference.

Figure 3:
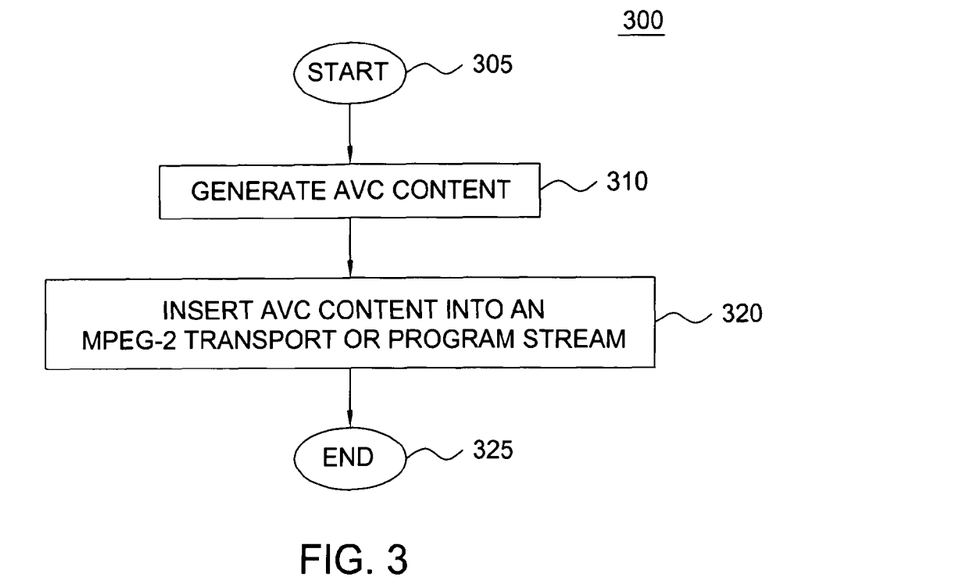
FIG. 3 illustrates a method for carrying AVC content in an MPEG-2 system of the present invention.

FIG. 3 illustrates a method 300 for carrying AVC content in an MPEG-2 system of the present invention. Method 300 starts in step 305 and proceeds to step 310.

In step 310, AVC content is generated. Specifically, input image data is processed by an AVC encoder to produce AVC encoded data, e.g., AVC elementary stream.

In step 320, the AVC content is inserted into an MPEG-2 transport stream (or program stream) for transmission. Since the present invention discloses the carriage of AVC content in an MPEG system, one or more of the above described constraints are implemented when the AVC content is carried by the MPEG-2 transport stream. Method 300 ends in step 325.

Figure 4:
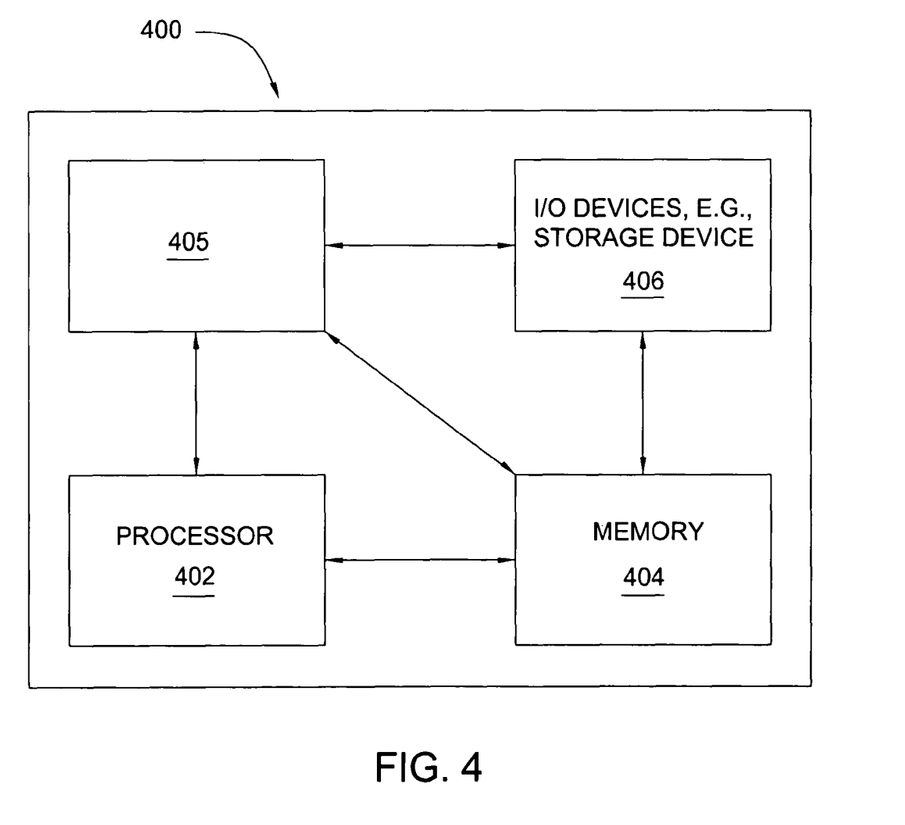
FIG. 4 illustrates the present invention implemented using a general purpose computer.

FIG. 4 is a block diagram of the present invention being implemented with a general purpose computer. In one embodiment, the encoding system or decoding system 400 is implemented using a general purpose computer or any other hardware equivalents. For example, the encoding system or decoding system 400 can be broadly implemented as the encoding system or decoding system of FIG. 2, or portions thereof, e.g., the video encoder 220, the audio decoder 222, the packetizer 230, the video decoder 270, the audio decoder 290 and so on. More specifically, the encoding system or decoding system 400 comprises a processor (CPU) 402, a memory 404, e.g., random access memory (RAM) and/or read only memory (ROM), one or more encoding or decoding components or elements 405 as described above, and various input/output devices 406 (e.g., storage devices, including but not limited to, a tape drive, a floppy drive, a hard disk drive or a compact disk drive, a receiver, a decoder, a decryptor, a transmitter, a clock, a speaker, a display, an output port, a user input device (such as a keyboard, a keypad, a mouse, and the like), or a microphone for capturing speech commands).

It should be understood that the one or more encoding or decoding components or elements 405 can be implemented as a physical device or subsystem that is coupled to the CPU 402 through a communication channel. Alternatively, the one or more encoding or decoding components or elements 405 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 404 of the computer. As such, the one or more encoding or decoding components or elements 405 (including associated data structures and methods) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for transporting Advanced Video Coding (AVC) content over a Moving Picture Experts Group-2 (MPEG-2) system stream, comprising:

receiving an input stream conveying video information at a computing device;

employing the computing device to generate the AVC content from the input stream, wherein the AVC content comprises a succession of coded access units, said succession of coded access units includes at least first and second consecutive coded pictures, at least said first coded picture is an Instantaneous Decoding Refresh (IDR) picture having an associated presentation time, said second coded picture has an associated presentation time that is later than the presentation time of said first coded picture by at least two picture periods, and the AVC content further comprises a parameter that indicates the presence of a still picture; and transporting said AVC content in a Moving Picture Experts Group-2 (MPEG-2) system stream that includes said parameter in a Program Map Table (PMT) or a Program Stream Map (PSM) of the system stream.

2. The method of claim 1, wherein each of said succession of coded access units starts with an access-unit-delimiter, and all coded bytes of an access unit of said succession occur between the access-unit-delimiter that the access unit starts with and a first byte of the access-unit-delimiter at the start of a next coded access unit.

3. The method of claim 1, wherein said second coded picture is an IDR picture.

4. The method of claim 1, wherein said AVC content includes Video Usability Information (VUI) and said VUI includes a parameter that indicates a fixed frame rate for display of pictures.

5. A non-transitory computer-readable medium having stored thereon a plurality of instructions, the plurality of instructions including instructions which, when executed by a processor, cause the processor to perform the steps of a method for transporting Advanced Video Coding (AVC) content, comprising:

receiving an input stream conveying video information;

generating the AVC content from the input stream, wherein the AVC content comprises a succession of coded access units, said succession of coded access units includes at least first and second consecutive coded pictures, at least said first coded picture is an Instantaneous Decoding Refresh (IDR) picture having an associated presentation time, said second coded picture has an associated presentation time that is later than the presentation time of said first coded picture by at least two picture periods, and the AVC content further comprises a parameter that indicates the presence of a still picture; and transporting said AVC content in a Moving Picture Experts Group-2 (MPEG-2) system stream that includes said parameter in a Program Map Table (PMT) or a Program Stream Map (PSM) of the system stream.

6. The computer readable medium of claim 5, wherein each of said succession of coded access units generated by the method starts with an access-unit-delimiter, and all coded bytes of an access unit of said succession occur between the access-unit-delimiter that the access unit starts with and a first byte of the access-unit-delimiter at the start of a next coded access unit.

* * * * *